May 19, 1970 R. GORDON ET AL 3,513,335
MAGNETOHYDRODYNAMIC GENERATOR AND CYCLE
Filed Jan. 6, 1966

INVENTORS
ROBERT GORDON
DAVID E. DEUTSCH
BY
Edward O. Ansell
Albert J. Miller
ATTORNEYS United States Patent Office 3,513,335
Patented May 19, 1970

3,513,335
MAGNETOHYDRODYNAMIC GENERATOR AND CYCLE
Robert Gordon, Sierra Madre, and David E. Deutsch, Walnut Creek, Calif., assignors to Aerojet-General Corporation, Azusa, Calif., a corporation of Ohio
Filed Jan. 6, 1966, Ser. No. 519,056
Int. Cl. H02n 4/02
U.S. Cl. 310—11                                  10 Claims

ABSTRACT OF THE DISCLOSURE

A method and apparatus relating a a nuclear powered magnetohydrodynamic generator. A compressed gaseous working fluid is heated to a non-ionizing temperature and then directly subjected to a source of nuclear fission fragments to effect non-thermal ionization of the working fluid. The ionized working fluid is then expanded through a magnetic field to generate electrical energy.

---

This invention relates to electrical power generation generally and more particularly to the magnetohydrodynamic generation of electrical power in which the ionization of the working fluid is produced by nuclear fission.

It is a well established principle of physics that a conductor moving in a magnetic field can be made to generate an electric current. Although it has been traditional to think in terms of a metallic conductor, the principle is equally valid where a fluid conductor is utilized.

Magnetohydrodynamics, abbreviated MHD, is the study of the motion of an electrically conducting fluid in the presence of a magnetic field. Fundamentally, when a hot ionized gas is passed through a transverse magnetic field and past electrodes in contact with the gas, electrons in the gas are deflected by the field. Velocity can be imparted to the heated fluid by expanding it through a nozzle or other restriction. Between collisions with other particles, the electrons make their way to one of the electrodes. An electric current is generated as the electrons move from one electrode (anode), through an external load, to the other electrode (cathode), and back to the gas stream. In this manner, electrical power can be generated.

Perhaps the most basic problem associated with an MHD generator is obtaining a sufficiently ionized gas at reasonable temperatures. Most common gases such as air, CO, $CO_2$, or the noble gases do not ionize thermally until quite high temperatures are reached, on the order of 4000° K. Since gases at this temperature cannot readily be contained, simply heating the gases to increase the thermal conductivity (ionization) is quite impractical.

The addition of a small amount of some easily ionizable material, such as an alkali metal vapor, increases the thermal conductivity of the gas at somewhat lower temperatures, on the order of 2500° K. Even at this temperature, however, containment is still a problem. The fact that the additive alkali metal vapors are highly corrosive compounds this problem.

Conventional gas cooled nuclear reactors have been proposed as heat sources for an MHD generator. It is possible by this means to obtain temperatures on the order of 2200° K. In addition, a small amount of ionization is produced by the secondary fission products (alpha, betas, gammas, and neutrons) present from the nuclear fission reaction.

It is well known, however, that approximately 84% of the 200 million electron volts of energy produced by a nuclear fission appear as kinetic energy of the *primary* fission products or fission *fragments*. These primary fission fragments have an electron deficiency and will expend their energy in the disruption of molecules thus producing ionization. Because of their large mass, between mass numbers 80 and 155, and their high charge, some 20–22 positive charges, the fission fragments are capable of producing a very high degree of ionization. Their mass and charge however, limit the distance which they can travel from their point of origin, the nuclear fission. This distance, commonly referred to as the range, has been found to be 1.9 to 2.5 cm. in air and correspondingly less in more dense materials. For example, their range has been found to be only $1.4 \times 10^{-3}$ cm. in aluminum.

Since, however, conventional gas cooled nuclear reactors utilize fuel forms of relatively thick cross sectional area, the majority of fission fragments are retained in the fuel. In addition, a cladding material normally placed around the fuel form eliminates the escape of these fragments entirely. Thus, conventional gas cooled reactors rely essentially upon heat to produce ionization in the working fluid.

It appears, therefore, that to produce significant ionization at reasonable temperatures, some non-thermal ionization means must be utilized.

It is, therefore, an object of this invention to provide a new and novel MHD generator cycle.

Another object of the invention is to provide a novel method of and improved means for producing electrical conductivity or ionization of the working fluid of a MHD generator by means of nuclear fission fragments.

A further object of the invention is to provide a new and novel MHD generator in which the working fluid is ionized by nuclear fission fragments.

Still another object of the present invention is to provide a new and novel MHD generator-nuclear fission reactor.

A still further object of the present invention is to provide a new and novel MHD generator-nuclear fission reactor-MHD compressor.

In its principal aspect, the present invention comprises an MHD generator cycle consisting of an MHD working fluid, means for compressing this working fluid, a nuclear reactor means in which the compressed working fluid is heated and ionized by nuclear fission fargments, and an MHD duct in which electrical power is generated from the ionized working fluid. The working fluid can be recycled back to the compressor, thus completing a closed cycle. In the preferred form, the MHD duct is an integral part of the nuclear reactor so that the working fluid is simultaneously being heated and ionized by the nuclear fission fragments and generating electrical power. Alternately, the means for compressing the working fluid can be MHD and made integral with the MHD electrical generating duct, both utilizing the same magnetic field.

These and other objects, advantages, and features of this invention will be apparent to those skilled in the art from the following description taken together with the appended drawings wherein.

Figure 1:
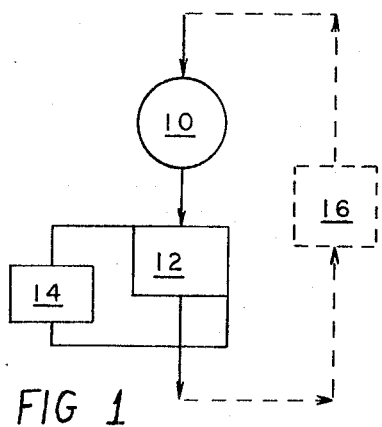
FIG. 1 is a block diagram of the preferred MHD generator cycle.

Referring to FIG. 1, there is illustrated a block diagram of the preferred MHD generator cycle of the present invention. The cycle operates with a gaseous working fluid, preferably of an inert character such as one of the noble gases, i.e., helium, argon, krypton, neon, or xenon. Innumerable other gaseous fluids, capable of being made electrically conductive would, however, be suitable.

The first step in the cycle is the compression of the gaseous working fluid to a sufficient pressure to overcome the pressure drop which will normally occur in the remainder of the cycle. A compressor 10 of any conventional type, e.g., centrifugal, piston, etc., is suitable for this purpose.

When the working fluid has been raised to a suitable pressure, it is then heated and exposed to the effects of nuclear fission fragments in a nuclear reacto-MHD generator 12. As previously stated, conventional gas cooled nuclear reactors are unsuited to subject a working fluid to nuclear fission fragments. The fuel elements of these gas cooled reactors can, however, be modified to accomplish this purpose by (1) removing any cladding between the fissionable fuel material and the gaseous working fluid, and (2) providing the fuel in extremely thin thickness, less than 25 microns. In this manner, the nuclear fission fragments are not contained within the fuel element but come into contact with the working fluid. A plurality of closed spaced, thin plates or screens coated with a thin film, less than 20 microns, of fissionable material can serve as fuel elements.

Alternately, a gaseous or solid form of fissionable material may be mixed or suspended in the working fluid stream. As the working fluid passes through the nuclear reactor-MHD generator 12, neutrons from the reactor cause the fissionable material to fission, thus producing fission fragments in the working fluid.

The fission fragments dissipate their energy in the working fluid, thus producing a high degree of ionization. In this manner the working fluid achieves a significant value of electrical conductivity. In addition, the working fluid removes the heat generated by the nuclear reactor whereby its own temperature is increased. While this rise in temperature is not sufficient to produce thermal ionization of the working fluid, it does assist the ionization of the working fluid by the fission fragments.

As the working fluid is achieving a high degree of electrical conductivity, it is expanded by a nozzle in the nuclear reactor-MHD generator 12 through the magnetic field, and electrodes in contact with the working fluid establish a current of electricity. This current can be drawn off through a load 14. While in the preferred form of the invention, the MHD generator is integrally combined with the nuclear reactor so that the heating, ionization, and electrical generation take place in a single unit, the nuclear reactor and MHD generator can be separate units and still achieve substantially the same results.

The cycle, as described above, can be either open or closed. To complete a closed cycle, the working fluid, after expansion through the nuclear reactor-MHD generator 12, can be recycled back to the compressor 10 through a heat sink 16. The cycle can then be repeated in its entirety to produce additional electrical power.

Figure 2:
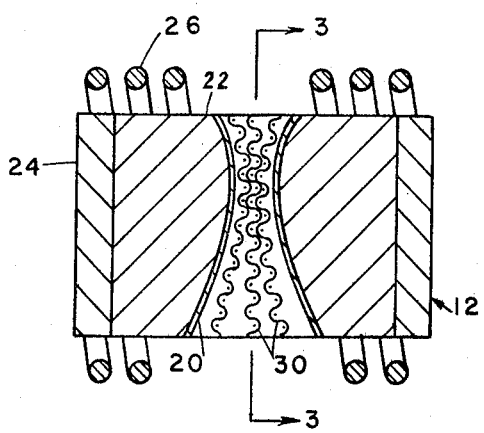
FIG. 2 is a sectional view of the combination nuclear reactor-MHD generator useful in the cycle of FIG. 1 and taken along line 2—2 of FIG. 3.
Figure 3:
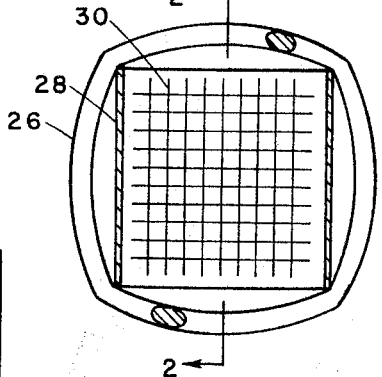
FIG. 3 is a sectional view of the combination nuclear reactor-MHD generator of FIG. 2 and taken along line 3—3 of FIG. 2.

FIGS. 2 and 3 illustrate a combination nuclear reactor-MHD generator useful in the MHD cycle of FIG. 1. The working fluid of the cycles, which again can be any ionizable gas, is passed through this combination reactor-generator 12 whereby electrical power is generated.

The combination reactor-generator comprises a passageway or duct 20 centrally located within a reactor core 22 of neutron fissionable material. The reactor core 22 is provided with conventional control means (not shown) such as movable neutron absorbing control rods. A neutron reflector 24, such as beryllium, essentially surrounds the reactor core 22. Surrounding the entire assembly are magnetic coils 26 connected to a power source (not shown) capable of producing a magnetic field within the duct 20. These coils can be either conventional or superconducting. Positioned at either side of the duct 20 and at various intermediate positions, if required, are electrodes 28. These electrodes are of a high temperature strength, electrically conductive material such as graphite.

The working fluid, under pressure, enters the small end of the duct 20. During its passage through the reactor-generator 12, the working fluid is heated by the thermal energy produced by the nuclear reaction taking place. In addition, by providing a thin fuel form such as a plurality of closely spaced screens 30, coated with a thin film of fissionable material, inside the duct 20, the working fluid is subjected to the direct effects of nuclear fission fragments. Alternately, a gaseous or solid compound of neutron fissionable material can be circulated with the working fluid. This circulating fuel will fission when the working fluid passes through the duct 20 and is subjected to the neutrons from the reactor core 22.

The fission fragments will ionize the heated working fluid, thus making it electrically conductive. A magnetic field has been established in the duct 20 by means of the coils 26. Therefore, as the electrically conductive working fluid passes through this magnetic field, a current is generated between the electrodes 28. This electrical energy can then be drawn off by an electrical load.

Figure 4:
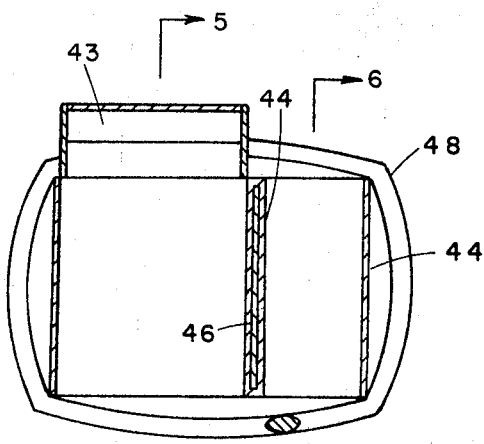
FIG. 4 is a sectional view of a combination nuclear reactor-MHD generator-compressor taken along line 4—4 of FIG. 5.
Figure 5:
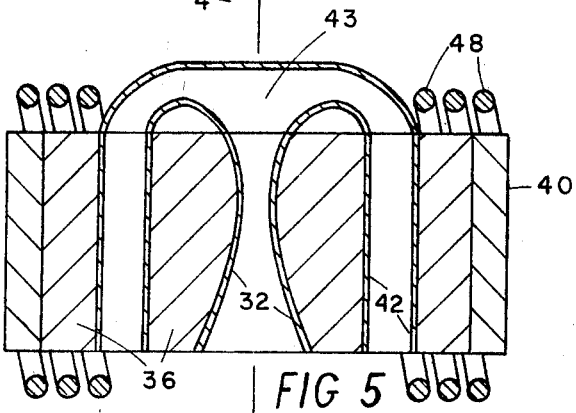
FIG. 5 is a sectional view of the combination nuclear reactor-MHD generator-compressor of FIG. 4 and taken along line 5—5 of FIG. 4.
Figure 6:
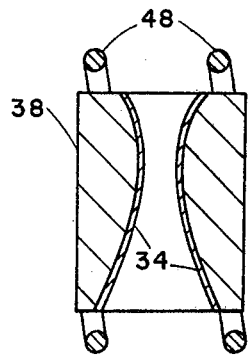
FIG. 6 is a sectional view of the combination nuclear reactor-MHD generator-compressor of FIG. 4 and taken along line 6—6 of FIG. 4.

FIGS. 4, 5, and 6 illustrate another form of the basic invention which combines the MHD generator-nuclear reactor 12 with an MHD compressor. This is accomplished by dividing the MHD duct 20 into a generator section 32 and a compressor section 34. The reactor core 22 is likewise divided into a generator section 36 and a compressor section 38. A reflector 40 is provided around the generator section 36 of the core. A preliminary pass through ducts 42 in the generator core 36 preheats the fluid before entrance into the generator duct 32. The ducts 42 are connected to the generator duct 32 by means of a passageway 43. Electrodes 44 are provided for both the ducts 32, 34, which are separated by a thermal shield 46. Magnetic coils 48 surround the entire assembly so as to establish a magnetic field in the ducts 32, 34.

Operation of the reactor-generator section is identical to the previous device except that the working fluid is preheated before entering the generator duct. Either fixed fuel is provided in the duct or gaseous/particulate fuel is circulated in the working fluid.

The magnetic field compresses the working fluid as it passes through the compressor duct. The compression is the result of the conducting fluid experiencing a force when in the pressure of a magnetic field. This force serves to compress the gas. The principle is the same as that of the MHD generator except that it is operating in its opposite sense.

Figure 7:
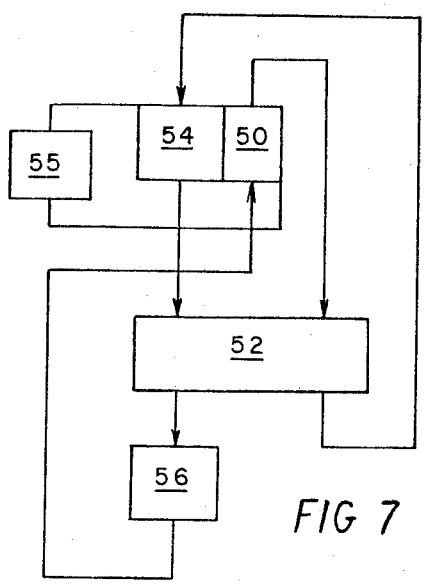
FIG. 7 is a block diagram of a MHD cycle using the nuclear reactor-MHD generator-compressor of FIGS. 4 through 6.

A cycle utilizing the nuclear reactor-MHD generator-compressor is shown in a block diagram as FIG. 7. The working fluid is compressed in the compressor section 50 of the combination, and is heated in a regenerator 52 (heat exchanger) before entering the generator section 54 of the reactor wherein electrical energy is generated through the load 55. After passing through the generator 54, the working fluid gives up heat in the regenerator 52 and a precooler 56 before re-entering the compressor 50.

In the above manner, thermal energy can be converted directly to electrical energy at a temperature which can be contained by commercially available materials. Ionization by means of fission fragments does not require high temperatures. In fact, temperatures as low as 1200° K. are practical. Existing gas cooled reactor technology can adequately handle temperatures of this magnitude.

The reactor performs the dual function of providing thermal energy and neutrons which lead to the ionization of the working fluid. Placing the MHD duct inside of the reactor greatly enhances the operation of the duct. Maximum benefits are obtained by this consolidation.

A further improvement in compactness and simplicity can result by incorporating an MHD compressor with the reactor-generator. A single magnetic coil provides the magnetic field for both ducts.

While a number of details of construction and alternate embodiments have been illustrated and described, alternatives and equivalents will occur to those skilled in the art which are within the scope and spirit of this invention. It is, therefore, desired that the protection be not limited to the details here illustrated and described but only by the proper scope of the appended claims.

What is claimed is:

1. An improved method of generating electrical energy which comprises the steps of:
    (a) compressing an ionizable gaseous working fluid,
    (b) heating said working fluid to a non-ionizing temperature,
    (c) subjecting the heated working fluid to nuclear fission fragments to effect a non-thermal ionization of the working fluid, and
    (d) expanding the ionized working fluid through a magnetic field to generate electrical energy.

2. An improved electrical power generating plant which comprises:
    (a) an ionizable gaseous working fluid,
    (b) means for compressing said working fluid,
    (c) nuclear reactor means operably associated with said compressing means for receiving said compressed working fluid from said compressing means, heating said working fluid to a non-ionizing temperature, and subjecting said heated working fluid to nuclear fission fragments to effect a non-thermal ionization of said working fluid, and
    (d) magnetohydrodynamic generating means operably associated with said reactor for receiving said ionized working fluid from said reactor means and expanding said ionized working fluid through a magnetic field to generate electrical energy.

3. The improved electrical power generating plant of claim 2 wherein said magnetohydrodynamic generating means is incorporated with said nuclear reactor means into an integral unit.

4. The improved electrical power generating plant of claim 2 wherein said compressing means is magnetohydrodynamic and is incorporated with said magnetohydrodynamic means and said nuclear reactor means into an integral unit.

5. The improved electrical power generating plant of claim 2 wherein said ionizable gaseous working fluid has dispersed therein a plurality of neutron fissionable particles less than 25 microns in their greatest dimension.

6. An improved magnetohydrodynamic electrical power generator comprising:
    (a) a nuclear reactor having an active core of neutron fissionable material,
    (b) a convergent-divergent duct passing through the active core of said nuclear reactor, said duct having inlet and outlet means and adapted to receive and expand a working fluid,
    (c) a thin fixed fuel form of neutron fissionable material mounted within said duct,
    said nuclear reactor heating the working fluid in said duct and supplying neutrons to fission said fuel form whereby nuclear fission fragments ionize the working fluid in said duct,
    (d) a magnetic coil arranged about said nuclear reactor to establish a magnetic field within said duct in a direction transverse to the expansion of the working fluid,
    (e) a pair of electrodes operably associated with said duct and in contact with the working fluid therein, and
    the expansion of the ionized working fluid through the transverse magnetic field establishing an electrical current between the pair of said electrodes to be drawn off as electrical energy.

7. The improved magnetohydrodynamic electrical power generator of claim 6 and in addition:
    (a) a second duct passing through the active core of said nuclear reactor having a magnetic field established therein by said magnetic coil about said nuclear reactor, and
    (b) a second part of electrodes operably associated with said second duct whereby said working fluid is magnetohydrodynamically compressed in passing through said second duct.

8. The improved magnetohydrodynamic electrical power generator of claim 7 and in addition a third duct passing through the active core of said nuclear reactor operably associated with said first duct to heat the working fluid before transferring the fluid to the first duct.

9. An improved method of generating electrical energy which comprises the steps of:
    (a) directly subjecting a gaseous working fluid which has been heated to a non-ionizing temperature to nuclear fission fragments to effect non-thermal ionization of the gaseous working fluid, and
    (b) expanding the ionized working fluid through a magnetic field to generate electrical energy.

10. An improved electrical power generating plant which comprises:
    (a) means for compressing an ionizable gaseous working fluid,
    (b) nuclear reactor means operably associated with said compressing means and adapted to receive said compressed working fluid from said compressing means, heat said fluid to a non-ionizing temperature, subject said working fluid to nuclear fission fragments to effect a non-thermal ionization of said working fluid, and
    (c) magnetohydrodynamic generating means operably associated with said reactor means, said generating means adapted to receive said ionized working fluid from said reactor means, and said generator means being adapted to expand said ionized working fluid through a magnetic field to generate electrical energy.

References Cited
UNITED STATES PATENTS

| | | | |
|---|---|---|---|
| 3,140,410 | 7/1964 | McLafferty | 310—11 |
| 3,149,248 | 9/1964 | Valfells | 310—11 |

DAVID X. SLINEY, Primary Examiner